US011222199B2

(12) United States Patent
Anders et al.

(10) Patent No.: US 11,222,199 B2
(45) Date of Patent: Jan. 11, 2022

(54) AUTOMATICALLY SUGGESTING BEHAVIORAL ADJUSTMENTS DURING VIDEO CONFERENCES

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Jonathan Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 16/210,504

(22) Filed: Dec. 5, 2018

(65) Prior Publication Data

US 2020/0184203 A1 Jun. 11, 2020

(51) Int. Cl.
*G06K 9/00* (2006.01)
*G06N 7/00* (2006.01)
*H04N 7/15* (2006.01)

(52) U.S. Cl.
CPC ..... *G06K 9/00355* (2013.01); *G06K 9/00315* (2013.01); *G06N 7/00* (2013.01); *H04N 7/15* (2013.01)

(58) Field of Classification Search
CPC ... G06K 9/00315; G06K 9/00355; H04N 7/15
See application file for complete search history.

(56) References Cited

U.S. PATENT DOCUMENTS 9,336,268 B1 * 5/2016 Moudy ............. G06F 16/24578
9,710,142 B1 * 7/2017 Vendrow ............... H04L 65/403
(Continued)

FOREIGN PATENT DOCUMENTS

WO 2008/064431 6/2008
WO WO-2008064431 A1 * 6/2008 ......... G06K 9/00315
WO WO-2018039646 A1 * 3/2018 ............. H04N 7/188

OTHER PUBLICATIONS

"Honest signals in video conferencing"—Byungki Byun, Anurag Awasthi, Philip A. Chou, Ashish Kapoor, Bongshin Lee, Mary Czerwinski; 2011 IEEE International Conference on Multimedia and Expo; Jul. 11-15, 2011 (Year: 2011).*
(Continued)

*Primary Examiner* — Mainul Hasan
(74) *Attorney, Agent, or Firm* — Michael O'Keefe; Andrew D. Wright; Roberts Calderon Safran & Cole, P.C.

(57) ABSTRACT

A computer-implemented method includes: generating, by a computer device, a baseline emotive state of a first user; generating, by the computer device, a baseline emotive state of a second user; determining, by the computer device, a current emotive state of the first user during a current video conference between the first user and the second user; determining, by the computer device, a current emotive state of the second user during the current video conference; and suggesting, by the computer device, a behavioral adjustment to the first user based on comparing the baseline emotive state of the first user, the current emotive state of the first user, the baseline emotive state of the second user, and the current emotive state of the second user.

20 Claims, 4 Drawing Sheets

(56) References Cited

U.S. PATENT DOCUMENTS

| | | | | |
|---|---|---|---|---|
| 10,382,722 | B1* | 8/2019 | Peters | G06K 9/00718 |
| 2005/0089206 | A1* | 4/2005 | Rice | A61B 5/16 |
| | | | | 382/128 |
| 2005/0201595 | A1* | 9/2005 | Kamei | G06K 9/00281 |
| | | | | 382/118 |
| 2005/0246165 | A1* | 11/2005 | Pettinelli | G10L 15/1807 |
| | | | | 704/207 |
| 2009/0079816 | A1* | 3/2009 | Qvarfordt | G06K 9/00335 |
| | | | | 348/14.16 |
| 2009/0265170 | A1* | 10/2009 | Irie | G10L 17/26 |
| | | | | 704/236 |
| 2011/0201899 | A1 | 8/2011 | Price et al. | |
| 2011/0295392 | A1* | 12/2011 | Cunnington | H04N 7/15 |
| | | | | 700/90 |
| 2014/0085501 | A1* | 3/2014 | Tran | G06F 3/005 |
| | | | | 348/222.1 |
| 2014/0207811 | A1* | 7/2014 | Kim | H04N 21/47202 |
| | | | | 707/758 |
| 2014/0212854 | A1* | 7/2014 | Divakaran | G09B 19/00 |
| | | | | 434/236 |
| 2014/0267413 | A1* | 9/2014 | Du | G06K 9/00281 |
| | | | | 345/633 |
| 2014/0278455 | A1* | 9/2014 | Chandrasekaran | G16H 40/67 |
| | | | | 705/2 |
| 2015/0193718 | A1* | 7/2015 | Shaburov | G06Q 10/06395 |
| | | | | 705/7.39 |
| 2015/0286858 | A1* | 10/2015 | Shaburov | G10L 25/63 |
| | | | | 382/103 |
| 2016/0022193 | A1* | 1/2016 | Rau | A61B 5/165 |
| | | | | 600/301 |
| 2016/0042648 | A1* | 2/2016 | Kothuri | A63F 13/213 |
| | | | | 434/236 |
| 2017/0177928 | A1* | 6/2017 | Cunico | G06K 9/00315 |
| 2018/0114057 | A1* | 4/2018 | Kim | G06K 9/00228 |
| 2018/0286070 | A1* | 10/2018 | Benedetto | G06F 3/013 |
| 2019/0251359 | A1* | 8/2019 | Pranger | G06K 9/00744 |

OTHER PUBLICATIONS

Doerrfeld, "20+ Emotion Recognition APIs That Will Leave You Impressed, and Concernedb", https://nordicapis.com/20-emotion-recognition-apis-that-will-leave-youimpressed-and-concerned/; Aug. 11, 2016, 11 pages.

McConville, "Measuring emotion with IBM Watson Speech to Text and Tone Analysis", IBM Cloud, https://www.ibm.com/blogs/bluemix/2016/11/measuring-emotion-ibm-watson-speech-text-tone-analysis/, Nov. 22, 2016, 12 pages.

Noroozi, "Survey on Emotional Body Gesture Recognition", Journal of IEEE Transactions on Affective Computing, Jan. 23, 2018, 19 pages.

Schindler, "Recognizing Emotions Expressed by Body Pose: a Biologically Inspired Neural Model", Neural Networks, 2008, 20 pages.

Singh, "Algorithm for Analysis of Emotion Using Body Language", International Journal of Engineering and Technical Research (IJETR), ISSN: 2321-0869, May 2015, 5 pages.

Sidana, "Top Five Emotion / Sentiment Analysis APIs for understanding user sentiment trends", Startup Tech Consulting, https://medium.com/@sifium/top-five-emotional-sentiment-analysis-apis-116cd8d42055, May 19, 2017, 10 pages.

Turabzadeh, "Facial Expression Emotion Detection for Real-Time Embedded Systems", MDPI, Jan. 26, 2018, 18 pages.

WikiPedia, "Nudge theory", https://en.wikipedia.org/wiki/Nudge_theory, accessed Nov. 8, 2018, 3 pages.

Chu, "What is 'nudge theory' and why should we care? Explaining Richard Thaler's Nobel economics prize-winning concept", Independent, https://www.independent.co.uk/news/business/analysis-and-features/nudge-theory-richard-thaler-meaning-explanation-what-is-it-nobel-economics-prize-winner-2017-a7990461.html, Oct. 9, 2017, 7 pages.

Albrecht, "How behavioural economics is being used against you", https://www.marketwatch.com/story/nobel-prize-winning-economist-richard-thalers-nudge-theory-has-a-dark-sidetoo-2017-10-17, Jun. 17, 2018, 6 pages.

* cited by examiner

AUTOMATICALLY SUGGESTING BEHAVIORAL ADJUSTMENTS DURING VIDEO CONFERENCES

BACKGROUND

The present invention relates generally to video conferencing and, more particularly, to automatically suggesting behavioral adjustments during video conferences.

Video conferencing is a computer-based communication session between two users or a group of users, regardless of their location, while enabling the participants to see and hear each other in a way determined by the type of a video conference. Although referred to as video conferencing, these communication sessions involve both audio and video communication.

SUMMARY

In a first aspect of the invention, there is a computer-implemented method includes: generating, by a computer device, a baseline emotive state of a first user; generating, by the computer device, a baseline emotive state of a second user; determining, by the computer device, a current emotive state of the first user during a current video conference between the first user and the second user; determining, by the computer device, a current emotive state of the second user during the current video conference; and suggesting, by the computer device, a behavioral adjustment to the first user based on comparing the baseline emotive state of the first user, the current emotive state of the first user, the baseline emotive state of the second user, and the current emotive state of the second user.

In another aspect of the invention, there is a computer program product including a computer readable storage medium having program instructions embodied therewith. The program instructions are executable by a computer device to cause the computer device to: generate a baseline emotive state of a first user; generate a baseline emotive state of a second user; determine a current emotive state of the first user during a current video conference between the first user and the second user; determine a current emotive state of the second user during the current video conference; and suggest a behavioral adjustment to the first user based on comparing the baseline emotive state of the first user, the current emotive state of the first user, the baseline emotive state of the second user, and the current emotive state of the second user.

In another aspect of the invention, there is system including a processor, a computer readable memory, and a computer readable storage medium. The system includes: program instructions to generate a baseline emotive state of a first user; program instructions to generate a baseline emotive state of a second user; program instructions to determine a current emotive state of the first user during a current video conference between the first user and the second user; program instructions to determine a current emotive state of the second user during the current video conference; and program instructions to suggest a behavioral adjustment to the first user based on comparing the baseline emotive state of the first user, the current emotive state of the first user, the baseline emotive state of the second user, and the current emotive state of the second user, The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to video conferencing and, more particularly, to automatically suggesting behavioral adjustments during video conferences. According to aspects of the invention, a system receives signals from video conferences and operates to: determine baseline emotive states of participants in the video conferences; determine current emotive states of participants in a current video conference; comparing the current emotive state of a first participant relative to the baseline emotive state of the first participant, and the current emotive state of a second participant relative to the baseline emotive state of second participant; and suggest a behavioral adjustment to the first participant and/or the second participant based on the comparing. In embodiments, the comparing comprises generating a model based on principal component analysis and/or discriminant function analysis techniques, and using the model to determine the current emotive states of the first and second participants relative to one another. In embodiments, the suggested behavioral adjustment is a nudge, and the system presents the suggested behavioral adjustment as a visual cue in a user interface of the video conference.

Academic studies have shown that negotiations are far more successful when a predefined set of protocols and techniques are applied. However most individuals are not well versed in debating techniques and therefore find it difficult to achieve their goals as part of a negotiation. When participants' behavioral norms are more successfully matched, the participants have a higher likelihood of a favorable negotiation. With the right set of behavioral adjustments (nudges), a user can more successfully negotiate with other users. In face-to-face negotiation this can be difficult to achieve. However in an online real-time video conference, usually with an n-way communication, there are pauses that can allow for behavioral cues to be observed and adjustments to be made.

Accordingly, aspects of the invention are directed to systems and methods that model behavioral norms of video conference participants for the purpose of providing suggested behavioral adjustments that are designed to improve the likelihood of a successful negotiation between two or more users. In accordance with aspects of the invention, there is a method comprising: observe and analyze a first meeting participant; observe and analyze a second meeting participant; derive a behavioral negotiation model (BNM); use the BNM to suggest behavioral adjustment (nudges); and score successful behavioral adjustment in the form of a learning model. In embodiments, the method includes categorizing the behavioral adjustments (nudges) pertaining to the user in order to sort and organize the behaviors based on relative weighting and importance to both the initial the first user and any subsequent user. In embodiments, the method includes predicting the probability of success of negotiation the user will have based on historical situational similarities. The historical situational similarities may include at least one of: has the user negotiated with the current person previously; was the BNM employed; and what was the outcome.

Embodiments of the invention improve the technology of video conferencing by providing users with automated tools that analyze user behavior during video conferences and provide suggestions to adjust behavior based on the analysis. Embodiments of the invention employ an unconventional arrangement of steps including: determining baseline emotive states of users; determining current emotive states of users; comparing the current emotive state of a first user relative to the baseline emotive state of the first user, and the current emotive state of a second user relative to the baseline emotive state of second user; and suggesting a behavioral adjustment to the first the first user and/or the second user based on the comparing. The steps themselves are unconventional, and the combination of the steps is also unconventional. For example, the step determining a baseline emotive state creates new information that does not exist in the system, and this new data is then used in subsequent steps in an unconventional manner. Embodiments of the invention also utilize elements and/or techniques that are necessarily rooted in computer technology, including cognitive computing based emotive analysis and computer-vision based body language analysis.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
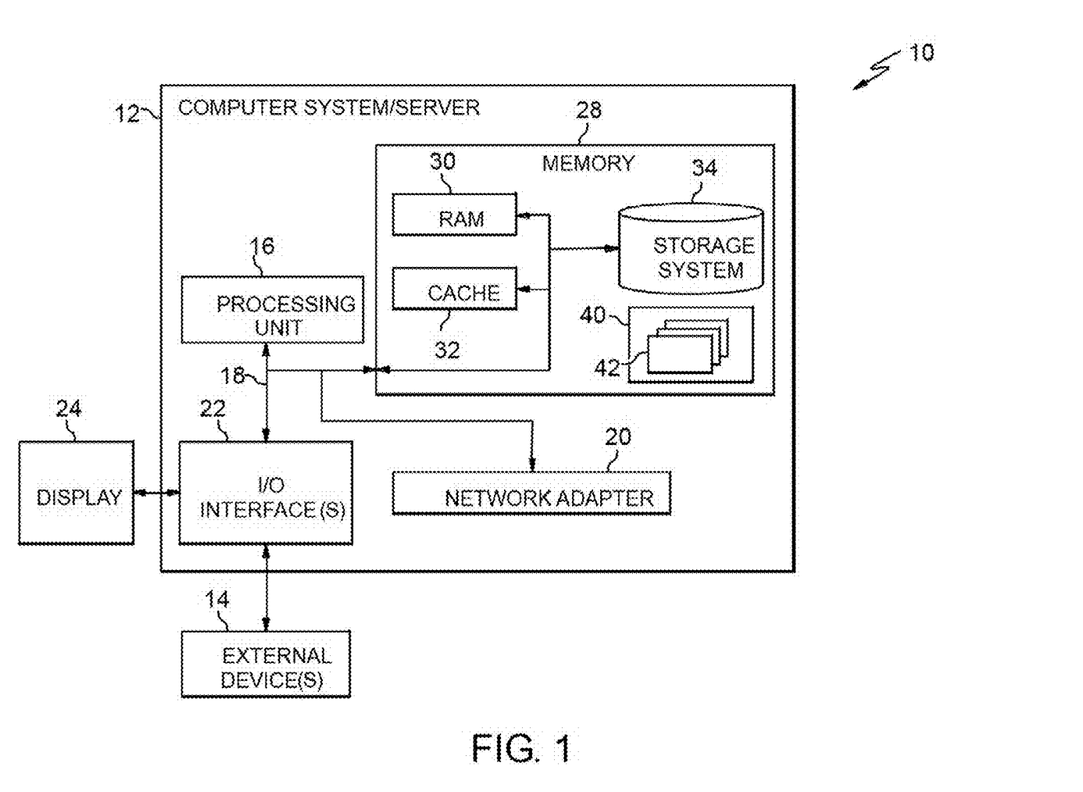
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
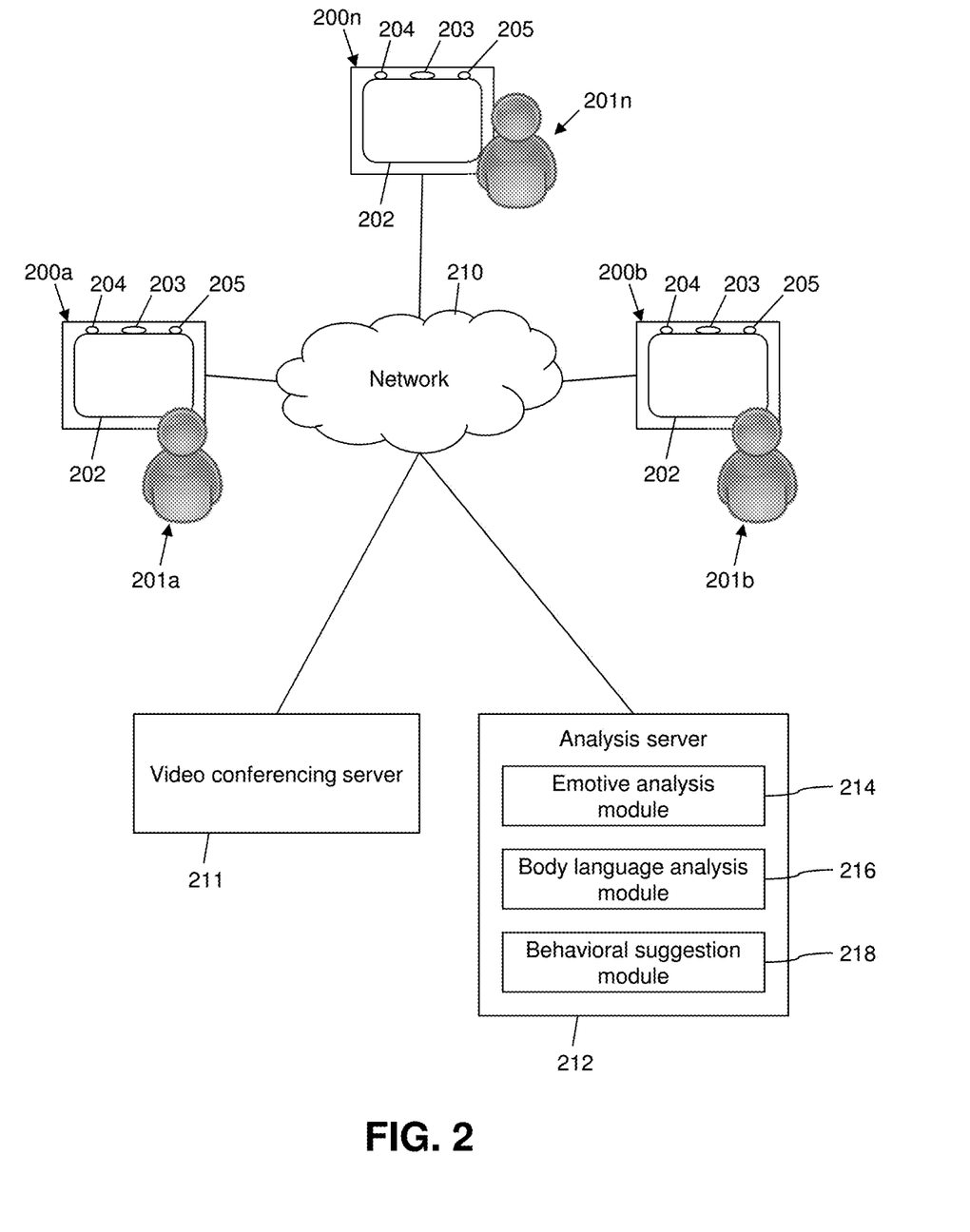
FIG. 2 shows a block diagram of an exemplary environment in accordance with aspects of the invention.

FIG. 2 shows a block diagram of an exemplary environment in accordance with aspects of the invention. The environment includes a first user device 200a associated with a first user 201a, a second user device 200b associated with a second user 201b, and an $n^{th}$ user device 200n associated with an nth user 201n. Each of the user devices 200a-n comprises a computer device such as a laptop computer, desktop computer, table computer, smartphone, etc., and may include one or more elements of computer system 12 of FIG. 1. In accordance with aspects of the invention, each of the user devices 200a-n is configured to perform video conferencing functions for its respective user. To this end, in embodiments, each of the user devices 200a-n includes (or is operatively connected to) a display screen 202 for displaying video images to a user, a camera 203 for capturing video images of the user, a microphone 204 for capturing audio (e.g., speech) emitted by the user, and a speaker 205 for emitting audio to the user. In this manner, the users 201a-n may utilize their respective user devices 200a-n to conduct a video conference with one another. Embodiments of the invention may be implemented with two users, e.g., users 201a and 201b, or with any number "n" users 201a-n joining the video conference via different user devices 200a-n.

As depicted in FIG. 2, the user devices 200a and 200b communicate with each other via a network 210. In embodiments, the network 210 is a communication network such as a LAN, WAN, or the Internet, or a combination of two or more such communication networks.

In some implementations, as shown in FIG. 2, a video conferencing server 211 is connected to the network 210. The video conferencing server 211 is a computer device, such as computer system 12 of FIG. 1, that is configured to provide video conference services to the user devices 200a-n, e.g., in a client-server arrangement. For example, the video conferencing server 211 may be configured to receive audio and video signals from all the user devices 200a-n, and to generate and transmit respective audio and video signals to each of the user devices 200a-n.

Still referring to FIG. 2, according to aspects of the invention, an analysis server 212 is also connected to the network 210 and configured to communicate with the user devices 200a-n and/or the video conferencing server 211 via the network 210. The analysis server 212 is a computer device, such as computer system 12 of FIG. 1, that is configured to receive audio and video signals of a video conference that the users 201a-n that are conducting using user devices 200a-n. In embodiments, the analysis server 212 analyzes the audio and video signals and provides suggested behavioral adjustments (e.g., modifications) to at least one of the users 200a-n based on the analysis.

In embodiments, the analysis server 212 comprises an emotive analysis module 214, a body language analysis module 216, and a behavioral suggestion module 218, each of which may comprise one or more program modules such as program modules 42 described with respect to FIG. 1. The analysis server 212 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

According to aspects of the invention, the emotive analysis module 214 is configured to perform emotive analysis of spoken discourse of participants of a video conference, such as users 201a-n that are conducting a video conference using user devices 200a-n. In embodiments, the emotive analysis module 214 is configured to: receive audio signals of a user (e.g., user 201a) from the video conference; convert the audio signals to text using real-time speech to text; and perform a tone analysis on the text to determine a respective quantitative value for each of plural different emotional components. In embodiments, the different emotional components comprise anger, disgust, fear, joy, sadness, and boredom; however, other types of emotional components and other combinations of emotional components may be used. In embodiments, the emotive analysis module 214 performs this function for each participant of the video conference, e.g., for each of users 201a-n. In this manner, the emotive analysis module 214 is configured to determine a quantitative measure of anger, a quantitative measure of disgust, a quantitative measure of fear, a quantitative measure of joy, a quantitative measure of sadness, and a quantitative measure of boredom for each of the users 201a-n based on the spoken discourse of each of the users.

According to aspects of the invention, the body language analysis module 216 is configured to perform emotive analysis of body language of participants of a video conference, such as users 201a-n that are conducting a video conference using user devices 200a-n. Body language can include facial expression (e.g., frown, pasted smile, tight-lipped smile, twisted smile, brow furrow, yawn, etc.) and/or body positioning (e.g., chin on hand, head cocked up to the left, crossed arms, etc.). In embodiments, the body language analysis module 216 is configured to receive video signals of a user (e.g., user 201a) from the video conference, and to determine a respective quantitative value for each of plural different emotional components based on analyzing the body language of the user in the video signals. For example, the body language analysis module 216 may be programmed to use computer vision techniques to determine the emotional state of a person by analyzing images of the body language of the person, e.g., comparing real time images of the person's face to a database of images of facial expressions that are each classified as one of the different emotional components (e.g., anger, disgust, fear, joy, sadness, boredom) and/or comparing real time images of the person's body position to a database of images of body positions that are each classified as one of the different emotional components (e.g., anger, disgust, fear, joy, sadness, and boredom). In embodiments, the different emotional components comprise the same components as those utilized by the emotive analysis module 214, e.g., anger, disgust, fear, joy, sadness, and boredom; however, other types of emotional components and other combinations of emotional components may be used. In embodiments, the body language analysis module 216 performs this function for each participant of the video conference, e.g., for each of users 201a-n. In this manner, the body language analysis module 216 is configured to determine a quantitative measure of anger, a quantitative measure of disgust, a quantitative measure of fear, a quantitative measure of joy, a quantitative measure of sadness, and a quantitative measure of boredom for each of the users 201a-n based on the body language of each of the users.

According to aspects of the invention, the behavioral suggestion module 218 is configured to generate behavioral suggestions to at least one of the users 201a-n based on the data generated by the emotive analysis module 214 and the body language analysis module 216. In embodiments, the behavioral suggestion module 218 is configured to: determine baseline emotive states of participants (e.g., users 201a and 201b) in a video conference based on data from plural video conferences in which the users were participants; determine current emotive states of participants (e.g., users 201a and 201b) in a current video conference; compare the current emotive state of a first participant (e.g., user 201a) relative to the baseline emotive state of the first participant (e.g., user 201a), and the current emotive state of a second participant (e.g., user 201b) relative to the baseline emotive state of second participant (e.g., user 201b); and suggest a behavioral adjustment to the first participant (e.g., user 201a) and/or the second participant (e.g., user 201b) based on the comparing.

In embodiments, the behavioral suggestion module 218 determines a baseline emotive state of a user (e.g., first user 201a) by determining a respective mean value for each of the emotional components (e.g., anger, disgust, fear, joy, sadness, and boredom) for the user 201a based on the analysis performed by the emotive analysis module 214 and the body language analysis module 216 for plural video conferences in which the user 201a is a participant. For example, over the course of plural video conferences in which the user 201a is a participant, the emotive analysis module 214 and the body language analysis module 216 may determine a number "m" of quantitative measures of each of the emotional components (e.g., anger, disgust, fear, joy, sadness, and boredom) for the user 201a, and the behavioral suggestion module 218 determines the baseline state comprising a mean value of the "m" quantitative measures of anger, a mean value of the "m" quantitative measures of disgust, etc. In this manner, the behavioral suggestion module 218 determines respective average values for each of anger, disgust, fear, joy, sadness, and boredom for the user 201a during video conferences. In embodiments, the behavioral suggestion module 218 determines a baseline for each respective user 201a, 201b, ..., 201n, where the baseline for a particular user represents that user's normal emotive state during video conferences.

Still referring to FIG. 2, according to aspects of the invention, during a current video conference between two users 201a and 201b, the emotive analysis module 214 and the body language analysis module 216 determine current values for the emotional components (e.g., anger, disgust, fear, joy, sadness, and boredom) for each of the users 201a and 201b, and provide these current values to the behavioral suggestion module 218. In response to receiving the current values, the behavioral suggestion module 218 compares the current value of each user to the baseline of each user, and makes a behavioral adjustment suggestion to one or more of the users based on the comparing.

The comparing can employ different algorithms in different embodiments. In one embodiment, the comparing comprises generating a model based on principal component analysis and/or discriminant function analysis techniques, and using the model to compare the current emotive states of the first and second participants relative to their respective baseline state and also relative to the other participant. This model is referred to herein as a behavioral negotiation model (BNM).

In this exemplary implementation, the emotive and body language features are collected and their relationships to each other are computed and plotted in a co-variance matrix. Given that the values output by the emotive analysis module 214 and the body language analysis module 216 might be very different across each feature (e.g., emotional component), the behavioral suggestion module 218 standardizes the values in the form of a co-variance matrix. The behavioral suggestion module 218 determines how significant each feature is as part of a pre-modelling step. For this step, a skree plot is used to determine which components return the highest level of variance in a model with the least amount of features. After determining the subset of components, the co-variance values are used to form two linear functions (i.e., the discriminant function model). These values are plotted to identify clustering around the emotive traits of the first user 201a versus the emotive traits of the second user 201b. In this way, the model is configured to separate the emotive traits of the first user 201a versus the second user 201b. In this manner, the behavioral suggestion module 218 differentiates between the two users' emotive states using the following steps: collect emotive and body language data for the different emotive features (e.g., components such as anger, disgust, fear, joy, sadness, and boredom) using the emotive analysis module 214 and the body language analysis module 216; calculate the co-variances between each feature; standardize the co-variances; reduce the number of features to balance the highest level of variance with the lower number of features; derive the discriminant function based on the key feature co-variances; and use this model to infer emotive traits of the first user 201a versus the second user 201b.

In another embodiment, the comparing comprises determining a respective delta for an emotional component for each user, and comparing the respective deltas of the users for this particular emotional component. In this embodiment, the system determines during the current video conference how far away each participant is from their determined baseline. For example, the system may determine by analyzing data of plural previous video conferences that the first user 201a has a baseline joy value of 0.35. In this example, during a current video conference, the system uses the emotive analysis module 214 and the body language analysis module 216 to determine that the first user 201a has a current joy value of 0.55. The system compares the determined current joy value of 0.55 to the baseline joy value of 0.35. The difference in values for an emotional component is referred to as a delta. In this example, the "delta.joy" for the first user 201a is 0.55-0.35=0.20 (i.e., the current joy value minus the baseline joy value). The delta can have a positive value or a negative value, where a positive value indicates the user's current state is more joyous than their baseline state, and a negative value indicates the user's current state is less joyous than the baseline state. A similar analysis and determination is performed for each of the emotional components for the first user 201a, e.g., current joy versus baseline joy, current anger versus baseline anger, etc. A similar analysis and determination is performed for each of the emotional components for the first user 201b, e.g., current joy versus baseline joy, current anger versus baseline anger, etc. In this manner, the system determines in real time during a video conference how the various components of each user's current emotional state compare to (e.g., quantitatively differ from) their baseline emotional state.

Continuing this example, the behavioral suggestion module 218 compares the deltas of each user for a particular component during the current video conference, and makes a suggestion to at least one of the users based on the comparing. The comparison in this regard is performed to determine if the two users are exhibiting a same amount of delta from their respective baseline for this component of their emotional state. In the event that the delta for the first user 201a is not equal to the delta for the second user 201b for a particular component (e.g., joy), then the system provides a suggestion to the first user 201a and/or a suggestion to the second user 201b to alter their behavior to attempt to minimize the difference between the deltas. For example, if the delta.joy for the first user 201a is less than the delta.joy for the second user 201*b*, then the system may provide a suggestion to the first user 201*a* to increase their joyous tone to match the joy level of the second user 201*b*. In a specific example to illustrate the point, if the delta.joy of the first user 201*a* is 0.20 and the delta.joy for the second user 201*b* is 0.41, the system determines that the first user 201*a* is currently less joyous relative to their baseline than the second user 201*b* is relative to the their baseline, and the system makes a suggestion to the first user 201*a* to act in a manner that demonstrates an increase in their expression of joy.

In embodiments, the suggestion is based on an amount of the difference between the delta of the first user 201*a* and the delta of the second user 201*b*, and different suggestions are provided for different amounts of difference of the deltas. For example, if the difference (i.e., delta.joy of the first user 201*a* minus delta.joy of the second user 201*b*) is within a first range of values, then a first suggestion is generated. If the difference is within a second range of values (that is different than the first range), then a second suggestion (that is different than the first suggestion) is generated. If the difference is within a third range of values (that is different than the first range and the second range), then a third suggestion (that is different than the first suggestion and the second suggestion) is generated. In this manner, implementations of the invention employ a nudge theory approach to suggested behavioral adjustments. This same nudge approach can be used with the output of the BNM, described earlier.

Figure 3:
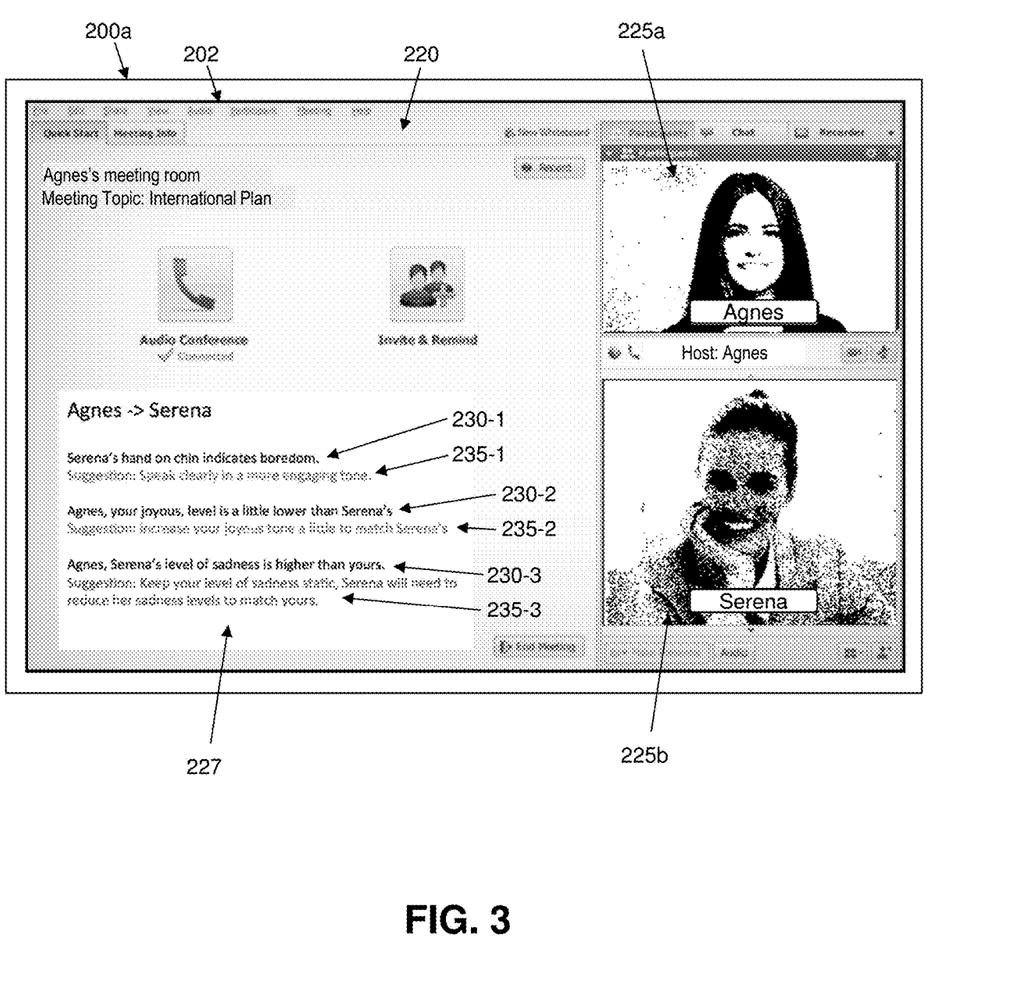
FIG. 3 shows an exemplary use case in accordance with aspects of the invention.

FIG. 3 shows an exemplary use case that illustrates aspects of the invention. FIG. 3 shows the first user device 200*a* during a video conference between the first user 201*a* and the second user 201*b*. As shown in FIG. 3, the display 202 of the first user device 200*a* shows a user interface (UI) 220 of the video conference. The UI 220 includes a first area 225*a* that shows a streaming video of the first user 201*a* (e.g., "Agnes") obtained by the camera 203 of the first user device 200*a*, and a second area 225*b* that shows a streaming video of the second user 201*b* (e.g., "Serena") obtained by the camera 203 of the second user device 200*b*.

According to aspects of the invention, the UI 220 also includes a third area 227 in which the system visually presents the suggestions to the user (e.g., the first user 201*a* in this example). The suggestions presented in the third area 227 are generated by the behavioral suggestion module 218 in the manner described herein, e.g., by comparing baseline data and current data for each user obtained from the emotive analysis module 214 and the body language analysis module 216. As illustrated in FIG. 3, each suggestion may include an observation (e.g., 230-1, 230-2, 230-3) and a suggested behavioral adjustment (e.g., 235-1, 235-2, 235-3). In embodiments, the suggestions are determined using a lookup table or other predefined data that defines suggestions relative to emotional components and amounts of delta.

Still referring to FIG. 3, the UI 220 and the suggestions included therein are specific to the first user 201*a* (e.g., Agnes in this example). According to aspects of the invention, concurrently during the same video conference between first user 201*a* and the second user 201*b*, the system generates and presents suggestions to the second user 201*b* via a different UI (not shown) that is specific to the second user 201*b* (e.g., Serena in this example). In this manner, each participant of the video conference is provided with targeted suggestions for behavior adjustments, wherein the suggestions are determined using baseline emotive state data and current emotive state data as described herein.

In embodiments, the system is arranged such that each user 201*a-n* is provided with the ability to opt-in and opt-out of the analyses and suggestions that are performed as described herein. For example, the UI 220 may be provided with a button or other user input field by which the user may provide input to opt-in or opt-out of the processes described herein. It should also be understood that, to the extent implementations of the invention collect, store, or employ personal information provided by, or obtained from, individuals (for example, emotive state data determined by the emotive analysis module 214 and the body language analysis module 216), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
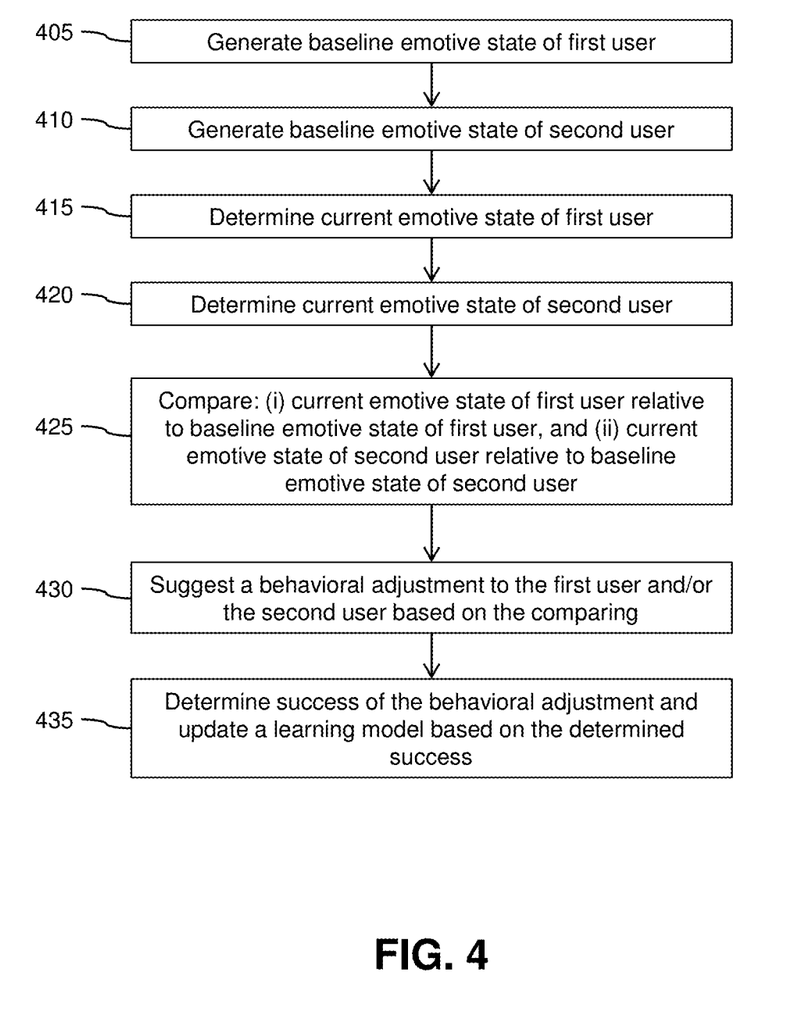
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 405, the system generates a baseline emotive state of a first user. In embodiments, and as described with respect to FIG. 2, the behavioral suggestion module 218 generates the baseline by analyzing data from plural video conferences in which the first user participated, the data being obtained from the emotive analysis module 214 and the body language analysis module 216. In embodiments, the baseline state may comprise a respective mean value for each emotional component (e.g., anger, disgust, fear, joy, sadness, and boredom) for the first user.

At step 410, the system generates a baseline emotive state of a second user. In embodiments, and as described with respect to FIG. 2, the behavioral suggestion module 218 generates the baseline by analyzing data from plural video conferences in which the second user participated, the data being obtained from the emotive analysis module 214 and the body language analysis module 216. In embodiments, the baseline state may comprise a respective mean value for each emotional component (e.g., anger, disgust, fear, joy, sadness, and boredom) for the second user.

At step 415, the system determines a current emotive state of a first user. In embodiments, and as described with respect to FIG. 2, the emotive analysis module 214 and the body language analysis module 216 determine respective current values for each emotional component (e.g., anger, disgust, fear, joy, sadness, and boredom) for the first user during a current video conference.

At step 420, the system determines a current emotive state of a second user. In embodiments, and as described with respect to FIG. 2, the emotive analysis module 214 and the body language analysis module 216 determine respective current values for each emotional component (e.g., anger, disgust, fear, joy, sadness, and boredom) for the second user during a current video conference.

At step 425, the system compares the current emotive state of the first user relative to the baseline emotive state of the first user, and the current emotive state of the second user relative to the baseline emotive state of the second user. In embodiments, and as described with respect to FIG. 2, the behavioral suggestion module 218 performs the comparing using a model, such as a discriminant function model. In other embodiments, as described with respect to FIG. 2, the behavioral suggestion module 218 performs the comparing using deltas.

At step 430, the system suggests a behavioral adjustment to the first user and/or the second user based on the comparing. In embodiments, and as described with respect to FIG. 2, the behavioral suggestion module 218 determines a suggested behavioral adjustment based on an amount of difference of the emotive states of the first user and the second user, and transmits data to the user device that causes the user device to present the suggested behavioral adjustment to the user.

At step 435, the system determines a success of the suggested behavioral adjustment and updates a learning model based on the determined success. In embodiments, the behavioral suggestion module 218 monitors the data from the emotive analysis module 214 and the body language analysis module 216 after presenting a suggested behavioral adjustment during the current video conference. Based on this monitoring, the behavioral suggestion module 218 determines whether the suggested behavioral adjustment changed the difference between the emotive states of the users, e.g., changed the difference between the deltas. In the event that the suggested behavioral adjustment decreases the difference between the emotive states of the users, then the behavioral suggestion module 218 deems the suggested behavioral adjustment a success and scores the suggested behavioral adjustment (e.g., in a learning model) such that the behavioral suggestion module 218 is more likely to suggest the suggested behavioral adjustment in subsequent video conferences. In the event that the suggested behavioral adjustment increases the difference between the emotive states of the users, then the behavioral suggestion module 218 deems the suggested behavioral adjustment a failure and scores the suggested behavioral adjustment (e.g., in the learning model) such that the behavioral suggestion module 218 is less likely to suggest the suggested behavioral adjustment in subsequent video conferences.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
generating, by a computer device, a baseline emotive state of a first user;
generating, by the computer device, a baseline emotive state of a second user;
determining, by the computer device, a current emotive state of the first user during a current video conference between the first user and the second user;
determining, by the computer device, a current emotive state of the second user during the current video conference;
suggesting, by the computer device, a behavioral adjustment to the first user based on comparing the baseline emotive state of the first user, the current emotive state of the first user, the baseline emotive state of the second user, and the current emotive state of the second user; and
providing a field in the user interface of the current video conference that permits a user to provide input to opt-in and opt-out of the suggesting,
wherein the comparing comprises deriving a discriminant function model using co-variance values of a co-variance matrix.

2. The method of claim 1, wherein:
the generating the baseline emotive state of the first user comprises emotive analysis of audio data of the first user and body language analysis of video data of the first user from the plural video conferences in which the first user participated; and
the generating the baseline emotive state of the second user comprises emotive analysis of audio data of the second user and body language analysis of video data of the second user from the plural video conferences in which the second user participated.

3. The method of claim 2, wherein:
the determining the current emotive state of the first user comprises emotive analysis of audio data of the first user and body language analysis of video data of the first user from the current video conference; and
the determining the current emotive state of the second user comprises emotive analysis of audio data of the second user and body language analysis of video data of the second user from the current video conference.

4. The method of claim 1, wherein the comparing comprises:
determining a first delta based on the baseline emotive state of the first user and the current emotive state of the first user;
determining a second delta based on the baseline emotive state of the second user and the current emotive state of the second user; and
comparing the first delta and the second delta.

5. The method of claim 1, wherein:
the comparing results in a value; and the suggesting comprises: suggesting a first behavioral adjustment when the value is in a first range; and suggesting a second behavioral adjustment when the value is in a second range.

6. The method of claim 1, further comprising determining a success of the suggested behavioral adjustment and updating a learning model based on the determined success.

7. The method of claim 1, wherein the suggesting comprises transmitting data to a user device that causes the user device to display the suggested behavioral adjustment in a user interface of the current video conference.

8. The method of claim 7, further comprising suggesting another behavioral adjustment to the second user based on the comparing the baseline emotive state of the first user, the current emotive state of the first user, the baseline emotive state of the second user, and the current emotive state of the first user.

9. The method of claim 8, wherein the suggesting the other behavioral adjustment to the second user comprises transmitting data to another user device that causes the other user device to display the other suggested behavioral adjustment in another user interface of the current video conference.

10. A system comprising a computer readable storage medium having program instructions embodied therewith, the program instructions executable by a computer device to cause the computer device to:
generate a first baseline emotive state of a first user;
generate a second baseline emotive state of a second user;
determine a current emotive state of the first user during a current video conference between the first user and the second user;
determine a current emotive state of the second user during the current video conference;
suggest a behavioral adjustment to the first user based on comparing the first baseline emotive state of the first user, the current emotive state of the first user, the second baseline emotive state of the second user, and the current emotive state of the second user; and
provide a field in the user interface of the current video conference that permits a user to provide input to opt-in and opt-out of the suggesting,
the generating the first baseline emotive state of the first user comprises determining first respective average values of plural emotional components by performing emotive analysis of audio data of the first user and body language analysis of video data of the first user from plural video conferences in which the first user previously participated; and
the generating the second baseline emotive state of the second user comprises determining second respective average values of the plural emotional components by performing emotive analysis of audio data of the second user and body language analysis of video data of the second user from plural video conferences in which the second user previously participated.

11. The system of claim 10, wherein:
the determining the current emotive state of the first user comprises emotive analysis of audio data of the first user and body language analysis of video data of the first user from the current video conference; and
the determining the current emotive state of the second user comprises emotive analysis of audio data of the second user and body language analysis of video data of the second user from the current video conference.

12. The system of claim 10, wherein the comparing comprises deriving a discriminant function model.

13. The system of claim 10, wherein the comparing comprises:
determining a first delta of a particular one of the plural emotional components based on the first baseline emotive state of the first user and the current emotive state of the first user;
determining a second delta of the particular one of the plural emotional components based on the second baseline emotive state of the second user and the current emotive state of the second user; and
comparing the first delta and the second delta.

14. The system of claim 13, wherein:
the comparing results in a value;
the suggesting comprises: suggesting a first behavioral adjustment when the value is in a first range; suggesting a second behavioral adjustment when the value is in a second range; and suggesting a third behavioral adjustment when the value is in a third range;
the first behavioral adjustment, the second behavioral adjustment, and the third behavioral adjustment all differ from one another; and
the first range, the second range, and the third range all differ from one another.

15. The system of claim 13, wherein the program instructions cause the computer device to:
determine a success of the suggested behavioral adjustment by comparing a changed difference between the first delta and the second delta; and
update a learning model used to determine the behavioral adjustment based on the determined success.

16. A system comprising:
a processor, a computer readable memory, and a computer readable storage medium;
program instructions to generate a first baseline emotive state of a first user;
program instructions to generate a second baseline emotive state of a second user;
program instructions to determine a current emotive state of the first user during a current video conference between the first user and the second user;
program instructions to determine a current emotive state of the second user during the current video conference;
program instructions to suggest a behavioral adjustment to the first user based on comparing the first baseline emotive state of the first user, the current emotive state of the first user, the second baseline emotive state of the second user, and the current emotive state of the second user; and
program instructions to provide a field in the user interface of the current video conference that permits a user to provide input to opt-in and opt-out of the suggesting,
wherein the generating the first baseline emotive state of the first user comprises determining first respective average values of plural emotional components by analyzing plural video conferences in which the first user previously participated;
the generating the baseline emotive state of the second user comprises determining second respective average values of the plural emotional components by analyzing plural video conferences in which the second user previously participated; and
the program instructions are stored on the computer readable storage medium for execution by the processor via the computer readable memory.

17. The system of claim 16, wherein:
the comparing results in a value; and the suggesting comprises: suggesting a first behavioral adjustment when the value is in a first range; and suggesting a second behavioral adjustment when the value is in a second range.

18. The system of claim 16, further comprising program instructions to determine a success of the suggested behavioral adjustment and update a learning model based on the determined success.

19. The method of claim 1, further comprising identifying clustering around emotive traits of the first user and emotive traits of the second user by plotting the co-variance values.

20. The system of claim 16, wherein the comparing comprises:
- determining a first delta based on the first baseline emotive state of the first user and the current emotive state of the first user;
- determining a second delta based on the second baseline emotive state of the second user and the current emotive state of the second user; and
- comparing the first delta and the second delta.

* * * * *